(12) United States Patent
Puente

(10) Patent No.: US 7,827,452 B2
(45) Date of Patent: Nov. 2, 2010

(54) ERROR CATCH RAM SUPPORT USING FAN-OUT/FAN-IN MATRIX

(75) Inventor: Edmundo De La Puente, Cupertino, CA (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 425 days.

(21) Appl. No.: 11/895,512

(22) Filed: Aug. 24, 2007

(65) Prior Publication Data

US 2009/0055690 A1 Feb. 26, 2009

(51) Int. Cl.
*G01R 31/28* (2006.01)
(52) U.S. Cl. .......................................... 714/724; 710/71
(58) Field of Classification Search ................ 324/765; 257/691; 714/724, 727, 734, 718; 710/71
See application file for complete search history.

(56) References Cited

U.S. PATENT DOCUMENTS

| | | | |
|---|---|---|---|
| 5,471,481 A | 11/1995 | Okumoto et al. | |
| 6,065,144 A * | 5/2000 | Knoch | 714/724 |
| 6,275,023 B1 | 8/2001 | Oosaki et al. | |
| 6,275,962 B1 | 8/2001 | Fuller et al. | |
| 6,349,397 B1 * | 2/2002 | Koga et al. | 714/727 |
| 6,392,427 B1 | 5/2002 | Yang | |
| 6,483,338 B2 * | 11/2002 | Weng et al. | 324/765 |
| 6,499,121 B1 | 12/2002 | Roy et al. | |
| 6,577,979 B1 | 6/2003 | Okitaka | |
| 7,091,598 B2 * | 8/2006 | Fujita et al. | 257/691 |
| 7,395,476 B2 * | 7/2008 | Cowell et al. | 714/734 |
| 7,421,632 B2 * | 9/2008 | Jordan et al. | 714/724 |
| 2004/0044936 A1 | 3/2004 | Rearick et al. | |
| 2006/0170453 A1 | 8/2006 | Zerbe et al. | |
| 2006/0290361 A1 | 12/2006 | Ellis et al. | |
| 2007/0216432 A1 | 9/2007 | Kister | |
| 2007/0266288 A1 | 11/2007 | Volkerink et al. | |
| 2007/0283197 A1 | 12/2007 | Jordan et al. | |
| 2008/0031166 A1 | 2/2008 | Fukuda | |

OTHER PUBLICATIONS

International Search Report and Written Opinion mailed on Oct. 22, 2008 for International Application No. PCT/US2008/073740.

* cited by examiner

*Primary Examiner*—David Ton
(74) *Attorney, Agent, or Firm*—Holland & Hart, LLP

(57) ABSTRACT

In accordance with one embodiment of the invention, a method and apparatus are provided for obtaining test data from multiples devices under test. This could be accomplished in accordance with one embodiment by outputting from a testing device a test signal for input in parallel to at least two devices under test; inputting in parallel to the testing device at least two response signals, each response signal produced by one of the at least two devices under test; storing the response signals received in parallel in a storage device; and serially outputting the response signals from the storage device.

20 Claims, 7 Drawing Sheets

ERROR CATCH RAM SUPPORT USING FAN-OUT/FAN-IN MATRIX

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND

Automated test equipment utilizes its channels to drive signals to or receive signals from a device under test (DUT). Each device under test is typically comprised of address PINs, control PINs, and data PINs. In the past, the automated test equipment has used dedicated PIN electronics channels for the data PINS. As a result, there was a one-to-one relationship between the channels and the data PINs on a device under test. In other words, the PIN electronics channels for the data lines were not shared by multiple devices under test. As a result, the time needed to test multiple devices—for example on a wafer—was long due to the fact that data for each device under test had to be read serially.

While attempts have been made to utilize the same PIN electronics channel to read data from multiple devices under test, they have required that the data be read serially from these devices under test. Thus, a first data read has to be performed from the first device under test, followed by a data read on the second device under test, followed by a third data read from the third device under test, etc. Thus, the time to perform data reads from multiple devices in this serial fashion has increased the testing time by a factor of the number of devices being tested. For example, to read from four devices under test utilizing the same test channel requires four times as long as it would be required to read data from a single device under test. As a result, the test time overhead (TTO) has typically been unacceptable. Thus, testing has typically been performed by dedicating a single PIN IO channel of a testing device to an individual data PIN on a device under test.

Another drawback in the past to testing multiple devices has been the lack of electrical isolation between devices in performing data reads from the devices. Thus, when two devices, for example, are read in a serial manner using a single data line, a bad device under test can unnecessarily cause the other device under test to appear damaged or of low quality. For example, if a first device under test has an electrical short, the lack of electrical isolation when reading from the second device under test can cause a second device under test to perform poorly. As a result, the second device under test might be categorized as substandard.

SUMMARY

According to one embodiment of the invention, an apparatus is provided for obtaining test data from multiple devices. The test apparatus can be comprised of a test signal generator configured to output from the testing device a first test signal for input in parallel to at least two devices in the test. The testing device can also include a response signal receiver configured to input in parallel to the testing device at least two response signals, each response signal produced by one of the devices in the test in response to the first test signal. Furthermore, the testing device can include a storage device such as a memory configured to store the response signals received in parallel. A serial output circuit can be configured to serially output the response signals from the storage device.

In accordance with another embodiment of the invention, a method of obtaining test data from multiple devices can be implemented by outputting from a testing device a first test signal and inputting the test signal in parallel to at least two devices under test; inputting in parallel to the testing device at least two response signals, each response signal produced by one of the two devices under test in response to the first test signal; storing the response signal received in parallel in a storage device; and serially outputting the response signals from the storage device for use in testing analysis.

Further embodiments of the invention will be appreciated by reviewing the specification and drawings described herein.

DETAILED DESCRIPTION

Figure 1:
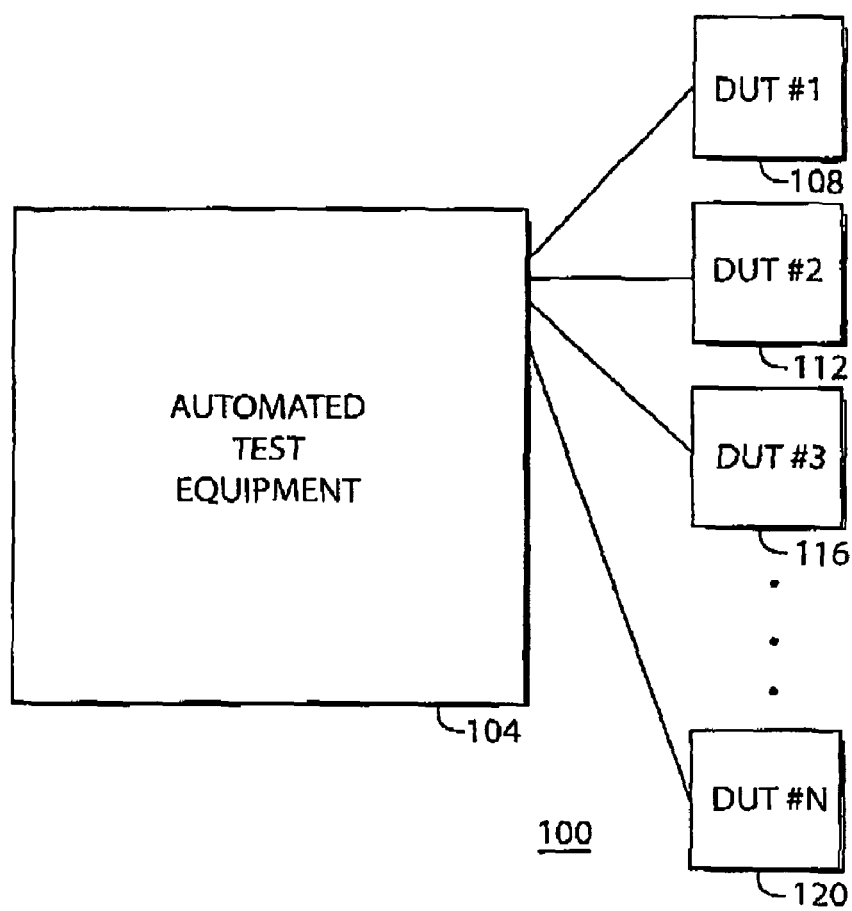
FIG. 1 illustrates a block diagram of a parallel testing arrangement of multiple devices under test, according to one embodiment of the invention.

Automated test equipment can be utilized to test multiple devices in serial fashion; however, such testing introduces a substantial time factor to the testing procedure. As a result, most testing equipment is configured with dedicated PIN electronics channels for the data PINs on devices under test. Thus, a channel is dedicated to a PIN of a single device in such testing schemes. In accordance with one embodiment of the invention, multiple devices under test can now be tested in parallel fashion. FIG. 1 illustrates the coupling of multiple devices 1 through N for testing by automated test equipment 104.

FIG. 1 illustrates a circuit 100 in which automated test equipment 104 is electrically coupled with devices 108, 112, 116, and 120. These devices represent devices under test and can essentially be any number of devices that can be configured in parallel so that the automated test equipment can provide input and receive output to and from the devices, respectively.

Figure 2:
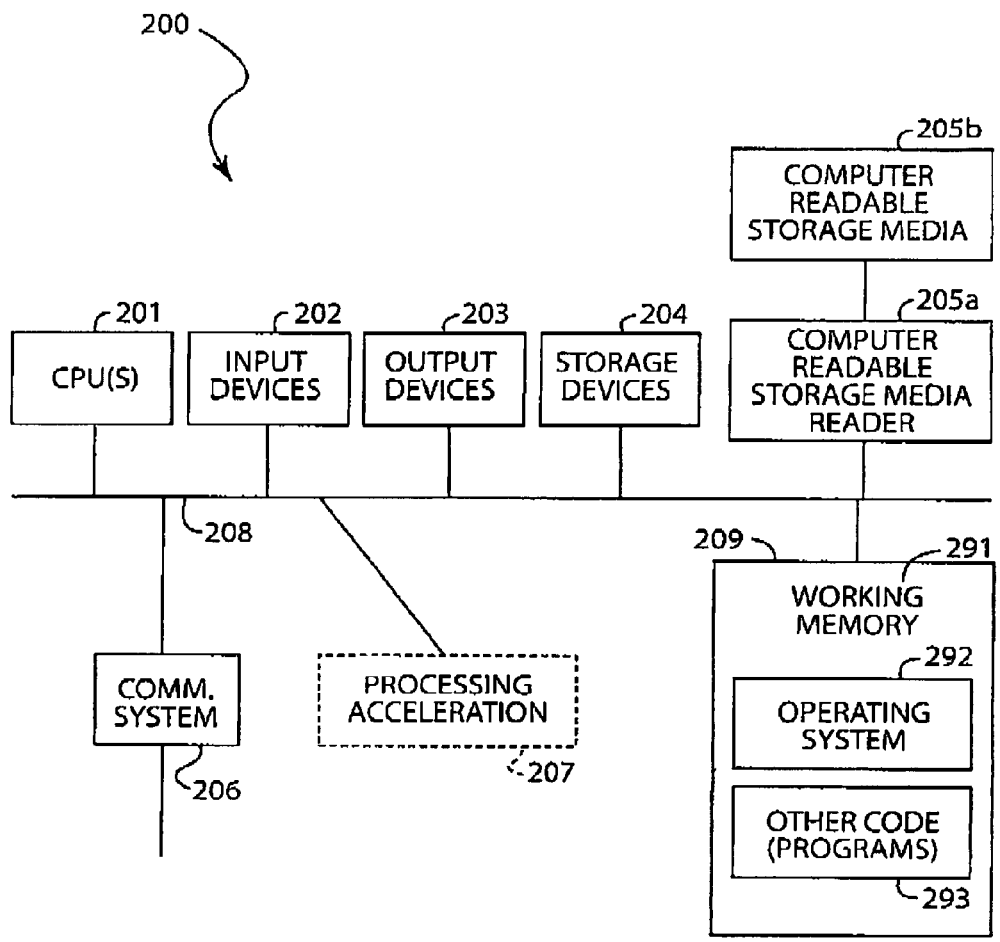
FIG. 2 illustrates a block diagram of a computing device which can be utilized to implement the automated test equipment shown in FIG. 1.

Referring to FIG. 2, a block diagram 200 is shown that can be utilized to implement the system requirements for the automated test device shown in FIG. 1. FIG. 2 broadly illustrates how individual system elements can be implemented. System 200 is shown comprised of hardware elements that are electrically coupled via bus 208, including a processor 201, input device 202, output device 203, storage device 204, computer-readable storage media reader 205a, communications system 206 processing acceleration (e.g., DSP or special-purpose processors) 207 and memory 209. Computer-readable storage media reader 205a is further coupled to computer-readable storage media 205b, the combination comprehensively representing remote, local, fixed and/or removable storage devices plus storage media, memory, etc. for temporarily and/or more permanently containing computer-readable information, which can include storage device 204, memory 209 and/or any other such accessible system 200 resource. System 200 also comprises software elements (shown as being currently located within working memory 291) including an operating system 292 and other code 293, such as programs, applets, data and the like.

System 200 has extensive flexibility and configurability. Thus, for example, a single architecture might be utilized to implement one or more servers that can be further configured in accordance with currently desirable protocols, protocol variations, extensions, etc. However, it will be apparent to those skilled in the art that embodiments may well be utilized in accordance with more specific application requirements. For example, one or more system elements might be implemented as sub-elements within a system 200 component (e.g. within communications system 206). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, optical, modem and/or other connection or connections to other computing devices might also be utilized.

Figure 3:
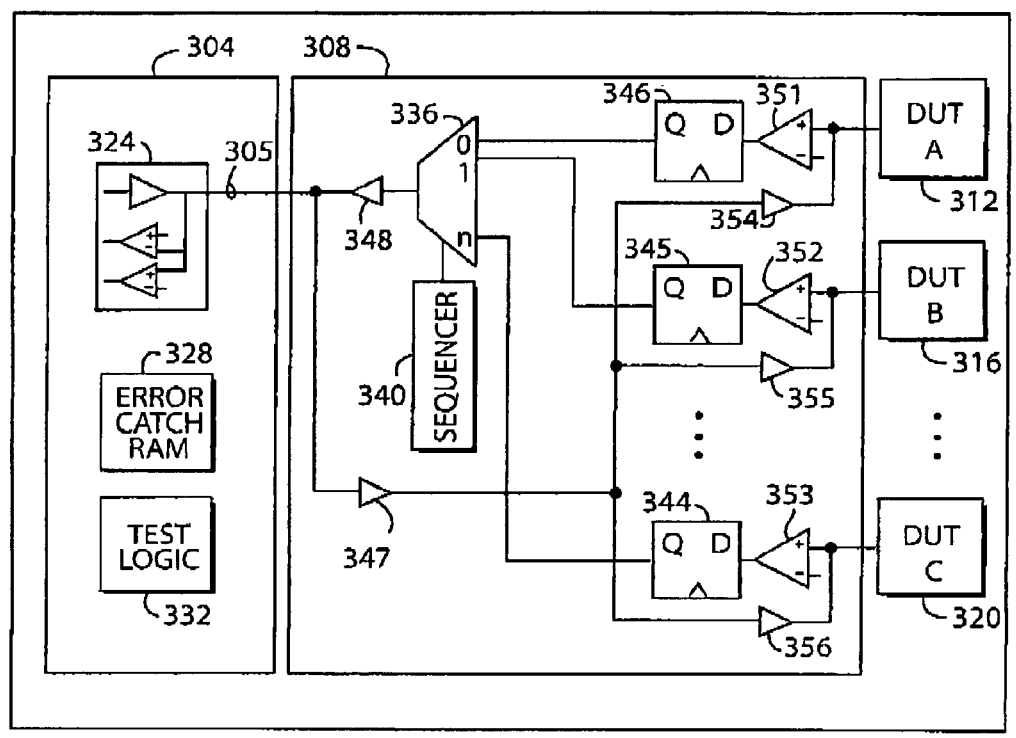
FIG. 3 illustrates a block diagram of an automated testing device for parallel testing of multiple devices under test, according to one embodiment of the invention.

Referring now to FIG. 3, a system 300 is shown. FIG. 3 illustrates a system that can be utilized to read in parallel manner from multiples devices under test and relay the information in a high speed serial fashion across a PIN electronics channel. This permits a single channel to be utilized for driving and receiving information to data lines of multiple devices under test. Furthermore, it allows multiple devices under test to be tested concurrently (i.e., in parallel) without increasing test time overhead.

FIG. 3 shows a testing device 304 in which a channel 305 is coupled with an intermediate circuit 308. Circuit 308 is used to fan out the signals driven by device 304 to multiple devices under test, shown as devices 312, 316, and 320. The ellipses illustrate that multiple devices can be tested. Referring again to block 304, block 324 shows a symbolic representation of a PIN electronics channel that can drive and receive signals. Comparators are shown for purposes of testing the signals received on channel 305. In addition, device 304 is also shown as including test logic block 332 that is utilized to perform data analysis once test data is received from a device under test. Furthermore, block 328 shows an error catch RAM that can be utilized to store test information for a device under test. For example, a RAM device can be tested so as to create a bit map of the RAM under test. This information can be stored in the error catch RAM so as to determine which rows or columns should be replaced due to manufacturing defects.

The circuit shown in block 308 can be utilized in accordance with one embodiment of the invention to fan out a single PIN electronics channel 305 to multiple devices under test. In the past, a single PIN electronics channel would be dedicated to a data PIN of a device under test or would require serial electrical coupling to multiple devices under test. However, the circuit shown in block 308 allows the PIN electronics channel 305 to drive and receive signals from multiple devices while reading data from the devices in a parallel manner. This introduces no test time overhead. In the past, serial reads produced significant test time overhead and thus discouraged such serial testing.

Block 308 shows that PIN electronics channel 305 can fan out a signal driven by automated test circuit 304 by utilizing buffer 347 to fan out the signal to buffers 354, 355, and 356. These buffers drive the signal to devices 312, 316, and 320, respectively.

When data is read from the devices under test, the read can be accomplished in parallel fashion. Thus, the data lines of devices 312, 316, and 320 are shown as electrically coupled with comparators 351, 352, and 353 in FIG. 3. The comparators perform a voltage level test by comparing the input voltage signal to a reference voltage signal. The comparators then drive latches 346, 345, and 344. These latches are clocked so as to latch the input signals at the appropriate time. The output of the latches are then electrically coupled with a memory device, such as serial shifter 336. A parallel read of the signals can then be accomplished by the serial shifter 336. Once the serial shifter 336 has captured its input signals, the signals can be output in serial fashion by utilizing sequencer 340 to sequence out the data. Buffer 348 drives the signals across channel 305 to PIN electronics circuit 324, which again performs a voltage level test on the input signals.

The serial stream of bits output by circuit 308 can then be manipulated by the test logic 332 to associate an individual bit with its corresponding device under test. The signal can be compared to an expected value so as to determine whether the device is operating correctly. If the device is not operating correctly, the error can be stored in the error catch RAM circuit 328. Logic tests can be performed on each bit of the serial stream so as to collect test data for each of the devices under test.

In this fashion, a single PIN electronics channel can be utilized not only to drive and receive information, but also to drive and receive information from multiple devices. This embodiment also allows the test equipment to perform parallel reads of data from these multiple devices while not introducing test time overhead. No test time overhead is introduced because the serial data stream can convey the entire amount of collected data before a subsequent read operation is performed and loaded into the latches.

FIG. 3 also illustrates that circuit 308 provides electrical isolation between the devices under test during read operations. Each device under test is coupled only to its associated comparator and is not electrically coupled with data lines of other devices being tested. Thus, if one of the devices under test fails, the other devices are not affected by that failure. Consequently, one can reliably test the other devices without worrying about the effects on those other devices caused by the failed device under test.

The time slicing approach for sending data back to the testing device circuit 304 relies on the fact that a tester channel typically can operate much faster than a device under test at that time. For example, it is typical to be able to receive data in a PIN electronics channel at speeds of 600 or 800 Mbs, whereas a typical nonvolatile memory operates below 50 Mbs.

The serial transfer performed by sequencer 340 and serial shifter 336 can occur in the background between subsequent device under test goals. This is shown, for example, in the example timing diagram shown in FIG. 4.

Figure 4:
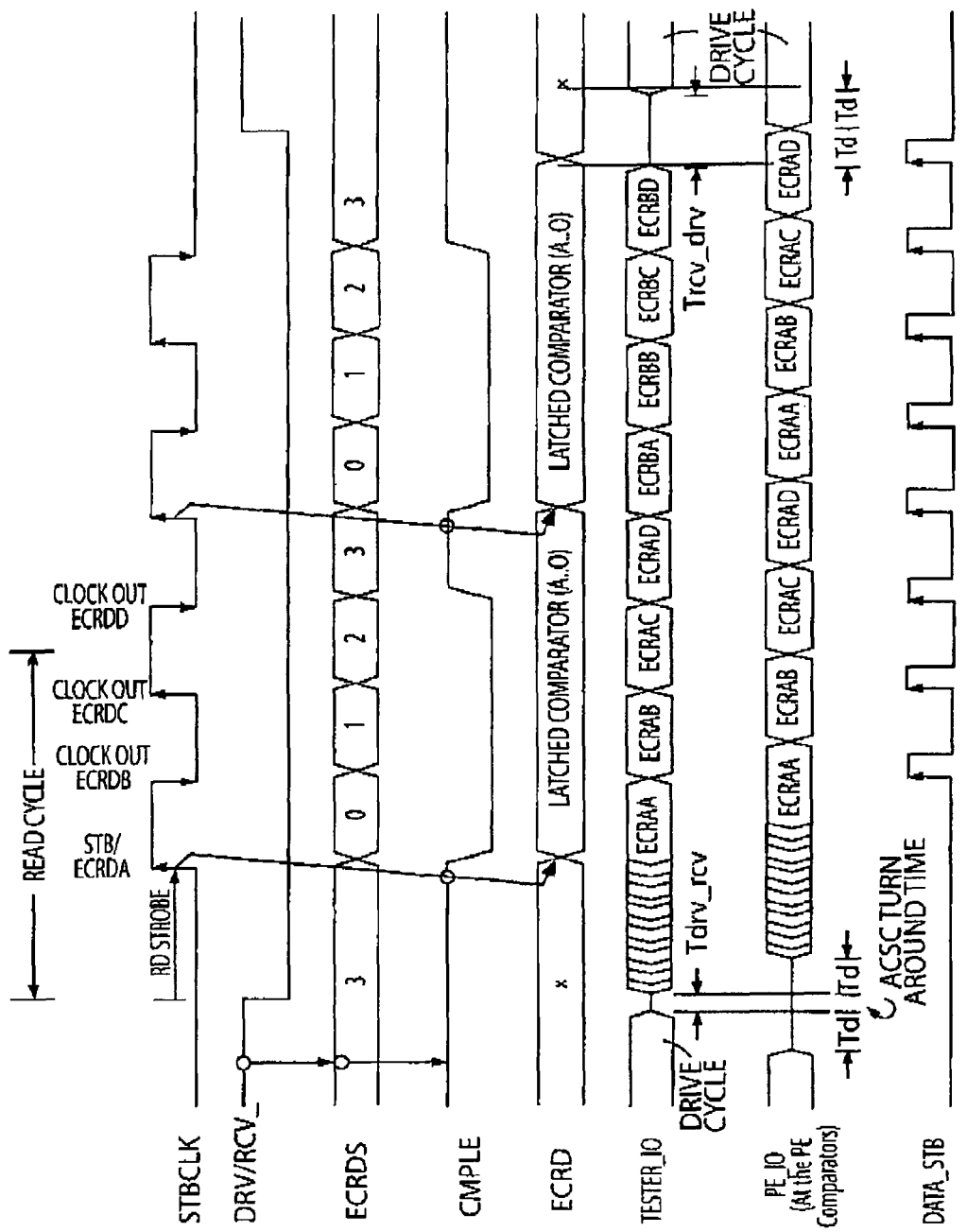
FIG. 4 illustrates an example of a timing diagram which can be utilized with the circuit shown in FIG. 3 in accordance with one embodiment of the invention.

In the timing diagram shown in FIG. 4, four devices under test are being utilized. The latches latch the results of the comparators when the STBCLK and CMPLE are true. Subsequent to this, the timing diagram shows that all four bits from the associated four devices are sequenced through using both edges of STBCLK to send error catch RAM data (ECRD) back to the testing device circuit 304.

The ECRDS signal shown in FIG. 4 selects which bit is to be sent out through the high-speed serial shifter. When ECRDS is 3, this will enable the serial shifter via CMPLE such that in the next strobe, a new set of level detected outputs are latched from the comparators. The sequence will then repeat for every compare cycle.

FIG. 3 shows the STBCLK signal as providing an initial leading edge that initiates the clocking of data out from circuit 308 to testing device 304. This initial leading edge can be generated by the test circuit 304 while subsequent transitions of STBCLK clock out subsequent bits from the serial shifter. Signal DRV/RCV illustrates the timing signal for when the channel is operating in a drive or receive mode. As noted earlier, signal ECRDS provides values to indicate which bit should be output from the serial shifter. Signal CMPLE provides the signal for compare latch enable. Thus, signal ECRD shows when the comparators A through D are latched.

The remaining three timing signals shown in FIG. 4 illustrate the transfer of information to the testing device circuit 304. The signal represented as TESTER_IO illustrates when the channel 305 is operating in a drive cycle or a receive cycle. It also illustrates a transition from the drive cycle to the receive cycle and from the receive cycle to the drive cycle. Furthermore, it illustrates the sequential transmission of data read from the devices under test as producing the following sequence of data: ECRAA, ECRAB, ECRAC, ECRAD, ECRBA, ECRBB, ECRBC, ECRBD. Signal PE_IO indicates the previous signal with the time delay introduced by transmission delay across channel 305. Finally, signal DATA_STB indicates a data strobe signal that can be utilized to clock data capture from the PE_IO signal for use by the logic test circuitry. This data strobe signal can be adjusted so as to fall within the middle portion of the data stream so as to produce the most reliable read of the high-speed data stream of information.

Figure 5:
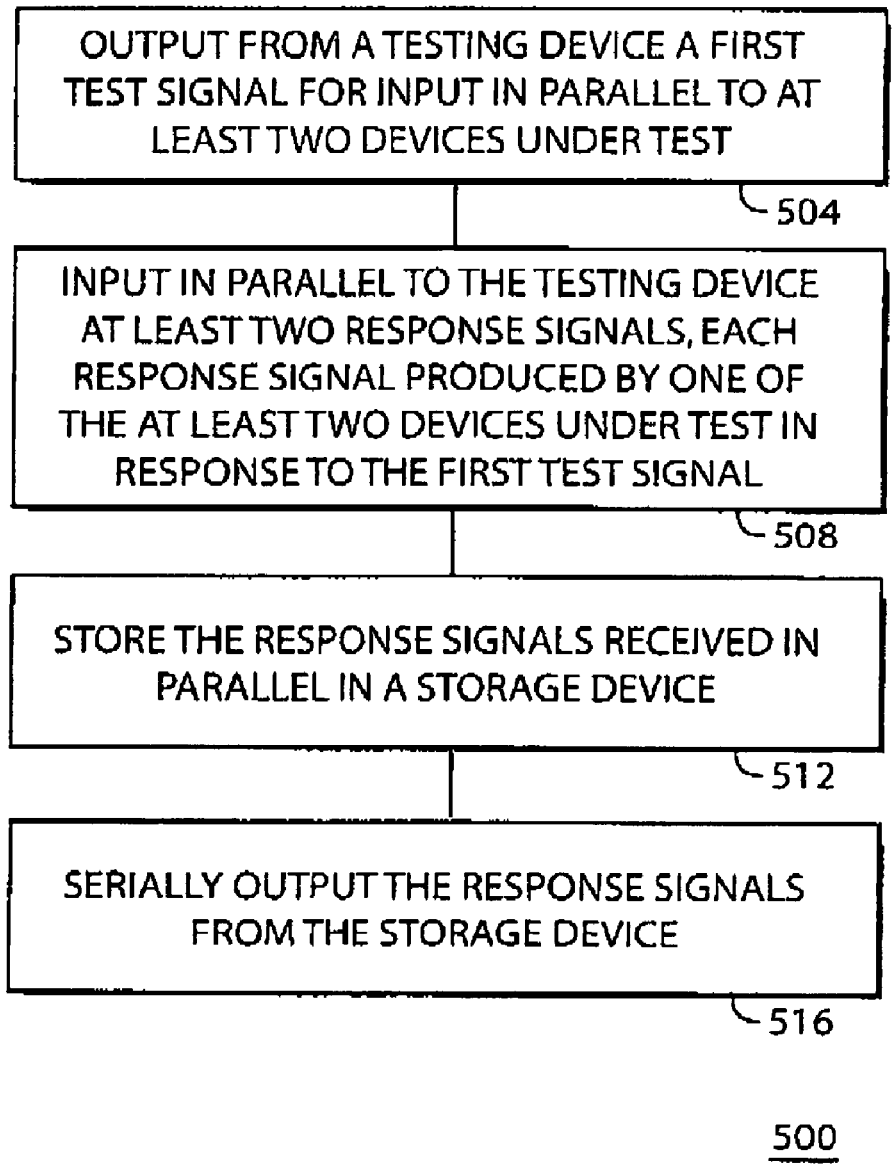
FIG. 5 illustrates a flowchart demonstrating a method of parallel testing of devices under test in accordance with one embodiment of the invention.

Referring now to FIG. 5, a flowchart 500 demonstrating a method of utilizing the circuit shown in FIG. 3 can be seen in accordance with one embodiment of the invention. Block 504 shows that output such as a first test signal is driven from a testing device for input in parallel to multiple devices under test. Block 508 illustrates that parallel reads from the devices under test can be made such that each response signal produced by the device under test is read in response to the first test signal that was driven by the testing device. In block 512, the response signals are stored in a storage device. And, in block 516, the stored response signals are output serially from the storage device. For example, the serial output is transmitted to logic circuitry for use in creating of entries in the error catch RAM.

Figure 6A:
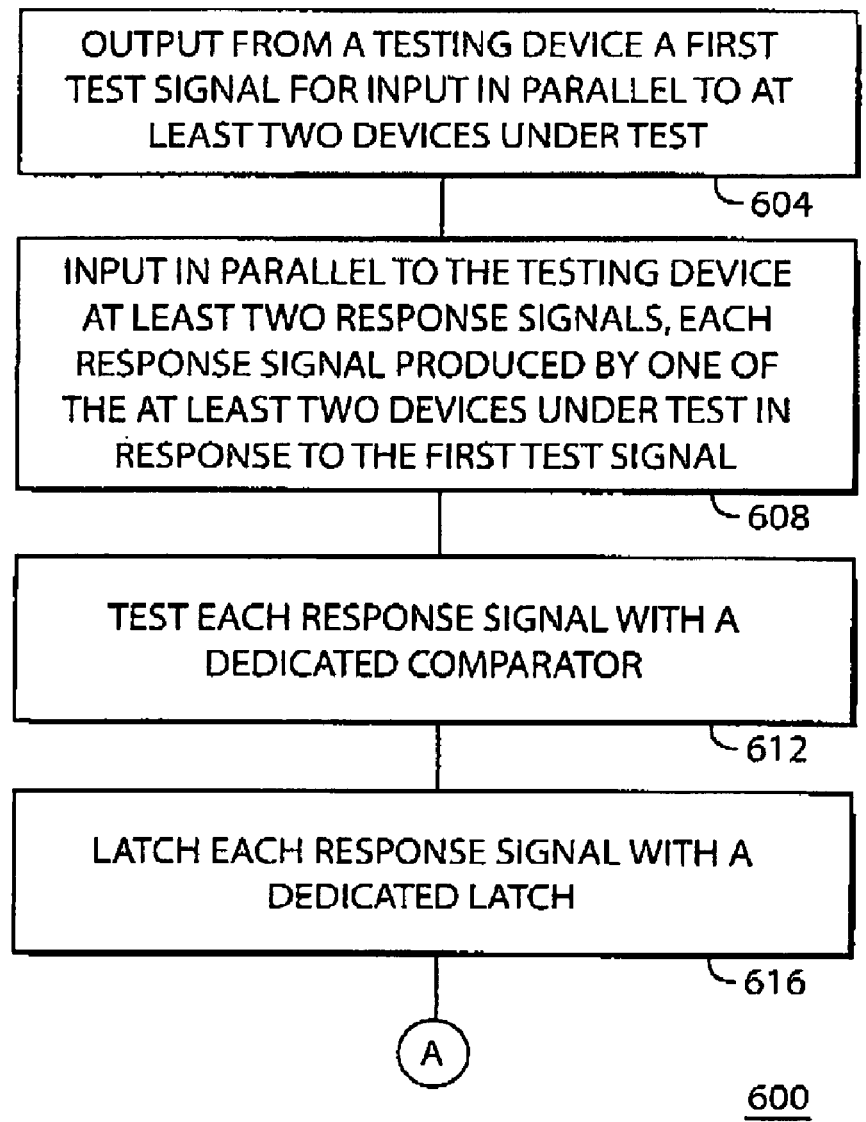
FIGS. 6A and 6B illustrate a flowchart demonstrating a method of parallel testing of multiple devices under test in accordance with one embodiment of the invention.
Figure 6B:
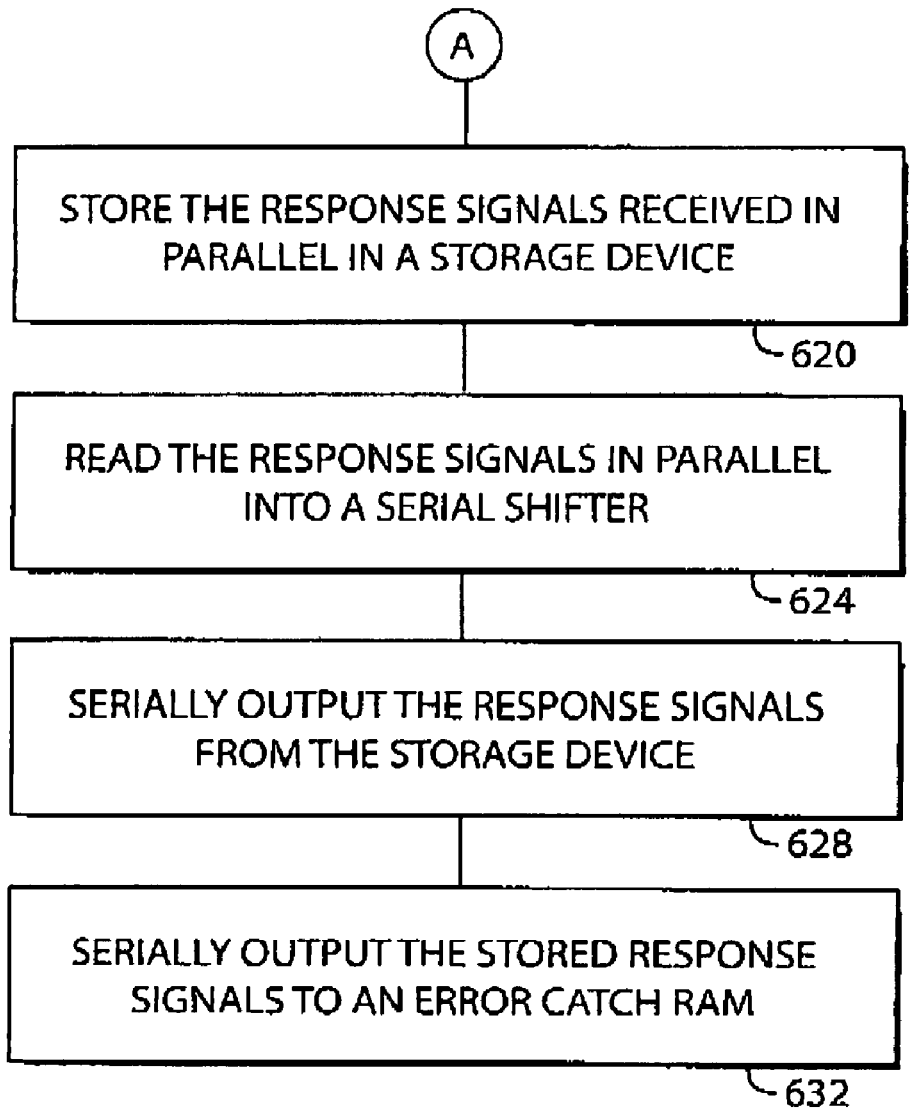

FIGS. 6A and 6B illustrate a flowchart 600 that demonstrates another embodiment of the invention. In block 604, a first test signal is output from a testing device for input in parallel to at least two devices under test. In block 608, the testing device receives response signals, e.g., at least two response signals, that are input in parallel to the testing device, wherein each response signal is produced by one of the devices under test in response to the preceding test signal. In block 612, each response signal is tested with a dedicated comparator. Furthermore, in block 616, each response signal is latched with a dedicated latch. In block 620, the response signals are received in parallel and stored in a storage device. For example, block 624 shows that the response signals can be read in parallel into a serial shifter where they are stored and the serial shifter serves as the storage device. In block 628, the response signals are output in serial fashion from the storage device. For example, block 632 shows that the serial output can be accomplished by driving the stored response signals to logic circuitry that can then store error information in an error catch RAM.

Thus, in accordance with various embodiments of the invention, different benefits can be achieved. For example, in accordance with one embodiment of the invention, parallel reads are enabled from multiple devices under test with error catch RAM support. This significantly reduces the test time overhead in testing multiple devices using the fan out/fan in testing approach.

In addition, one embodiment of the invention enables the user to fully share not only address and control PIN electronics across multiple devices, but also to share tester channels being used as data I/O. This can increase the parallelism of an existing tester.

Furthermore, because the fan out/fan in is done using active components, when a device fails, it allows for isolation of the failing device. Thus, the failing device can be turned off while testing of other devices continues. This can be important especially in wafer sort due to the difficulty of wafer sort not being able to retest devices that were affected by a failing device.

In addition, one embodiment allows the sharing of a single line between a tester and the new circuit shown as circuit 308 in FIG. 3. The serial communication along this line reduces the total number of lines needed between the tester and the devices under test.

Being able to capture individual errors in a memory device, for example, can be valuable for applications where one is interested in using that data to perform repair or analysis. This is typical testing of nonvolatile memory devices that allow for cell repair using redundant rows and/or columns that are built into the device. Without the ability to capture a device error map, one cannot perform such a repair.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well. Furthermore, the embodiments of the invention may be embodied as code stored in a computer-readable memory of virtually any kind including, without limitation, RAM, ROM, magnetic media, optical media, or magneto-optical media. Even more generally, the embodiments of the invention could be implemented in software, or in hardware, or any combination thereof including, but not limited to, software running on a general purpose processor, microcode, PLAs, or ASICs.

It is also envisioned that embodiments of the invention could be accomplished as computer signals embodied in a carrier wave, as well as signals (e.g., electrical and optical)

propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents.

It is thought that the apparatuses and methods of the embodiments of the present invention and its attendant advantages will be understood from this specification. While the above is a complete description of specific embodiments of the invention, the above description should not be taken as limiting the scope of the invention as defined by the claims.

What is claimed is:

1. A method of obtaining test data from a plurality of devices under test, said method comprising:
    outputting from a testing device a first test signal for input in parallel to at least two devices under test;
    inputting in parallel to said testing device at least two response signals, each response signal produced by one of said at least two devices under test in response to said first test signal;
    storing said response signals received in parallel in a storage device;
    serially outputting said response signals from said storage device.

2. The method as claimed in claim 1 wherein said inputting in parallel to said testing device said at least two response signals comprises:
    latching each response signal with a dedicated latch.

3. The method as claimed in claim 1 wherein said inputting in parallel to said testing device said at least two response signals comprises:
    testing each response signal with a dedicated comparator;
    latching each response signal with a dedicated latch.

4. The method as claimed in claim 1 wherein said storing said response signals received in parallel comprises:
    reading said response signals in parallel into a serial shifter.

5. The method as claimed in claim 1 wherein said serially outputting said response signals from said storage device comprises:
    serially outputting said stored response signals to a logic tester.

6. The method as claimed in claim 1 wherein said serially outputting said response signals from said storage device comprises:
    serially outputting said stored response signals to an error catch ram.

7. The method as claimed in claim 1 wherein said outputting from said testing device said first test signal for input in parallel to said at least two devices under test comprises:
    generating said first test signal;
    providing a plurality of devices under test having the same circuit configuration;
    inputting said first test signal in parallel to the same location at each device under test.

8. An apparatus for obtaining test data from a plurality of devices under test, said apparatus comprising:
    a test signal generator configured to output from a testing device a first test signal for input in parallel to at least two devices under test;
    a response signal receiver configured to input in parallel to said testing device at least two response signals, each response signal produced by one of said at least two devices under test in response to said first test signal;
    a storage device configured to store said response signals received in parallel;
    a serial output circuit configured to serially output said response signals from said storage device.

9. The apparatus as claimed in claim 8 wherein said response signal receiver for inputting in parallel to said testing device said at least two response signals comprises:
    a plurality of latches, each of said latches dedicated to latching one of said response signals.

10. The apparatus as claimed in claim 8 wherein response signal receiver configured to input in parallel said at least two response signals comprises:
    a plurality of comparators, each of said comparators dedicated for testing one of said response signals;
    a plurality of latches, each of said latches dedicated to one of said response signals.

11. The apparatus as claimed in claim 8 wherein said storage device comprises a serial shifter.

12. The apparatus as claimed in claim 8 and wherein said storage device is coupled with a logic tester configured to test said stored response signals.

13. The apparatus as claimed in claim 8 wherein said storage device is coupled with an error catch ram.

14. The apparatus as claimed in claim 8 wherein said test signal generator is configured to:
    generate said first test signal;
    couple with a plurality of devices under test having the same circuit configuration;
    input said first test signal in parallel to the same location at each device under test.

15. An apparatus for obtaining test data from a plurality of devices under test, said apparatus comprising:
    means for generating a first test signal for input in parallel to at least two devices under test;
    means for receiving an input in parallel from at least two response signals, each response signal produced by one of said at least two devices under test in response to said first test signal;
    means for storing said response signals received in parallel;
    means for serially outputting said response signals from said means for storing.

16. The apparatus as claimed in claim 15 wherein said means for receiving comprises:
    a plurality of latches, each of said latches dedicated to latching one of said response signals.

17. The apparatus as claimed in claim 15 wherein said means for receiving comprises:
    a plurality of comparators, each of said comparators dedicated for testing one of said response signals;
    a plurality of latches, each of said latches dedicated to one of said response signals.

18. The apparatus as claimed in claim 15 wherein said means for storing comprises a serial shifter.

19. The apparatus as claimed in claim 15 and wherein said means for storing is coupled with a logic tester configured to test said stored response signals.

20. The apparatus as claimed in claim 15 wherein said means for storing is coupled with an error catch ram.

* * * * *